United States Patent [19]

Wagner

[11] Patent Number: 5,615,355
[45] Date of Patent: Mar. 25, 1997

[54] METHOD AND APPARATUS FOR BUFFERING A USER APPLICATION FROM THE TIMING REQUIREMENTS OF A DRAM

[75] Inventor: Steven D. Wagner, Belmont, Calif.

[73] Assignee: Ampex Corporation, Redwood City, Calif.

[21] Appl. No.: 401,329

[22] Filed: Mar. 9, 1995

Related U.S. Application Data

[63] Continuation of Ser. No. 965,118, Oct. 22, 1992, abandoned.

[51] Int. Cl.$^6$ .................................................. G06F 13/14
[52] U.S. Cl. .......................................... 395/494; 395/432
[58] Field of Search ................................ 395/431, 438, 395/500, 550, 432, 494, 495, 496, 250; 365/230.03, 233

[56] References Cited

U.S. PATENT DOCUMENTS

| | | | |
|---|---|---|---|
| 4,357,702 | 11/1982 | Chase et al. | 371/1 |
| 4,441,125 | 4/1984 | Parkinson | 358/213.31 |
| 4,463,443 | 7/1984 | Frankel et al. | 395/250 |
| 4,833,625 | 5/1989 | Fisher et al. | 395/139 |
| 4,864,402 | 9/1989 | Ebihara et al. | 358/160 |
| 4,882,710 | 11/1989 | Hashimoto et al. | 365/189.05 |
| 4,888,739 | 12/1989 | Frederick et al. | 365/221 |
| 4,918,645 | 4/1990 | Lagoy, Jr. | 495/478 |
| 4,931,870 | 6/1990 | den Hollander | 358/142 |
| 4,949,190 | 8/1990 | Thompson | 358/426 |
| 5,046,080 | 9/1991 | Lee et al. | 379/53 |
| 5,072,420 | 12/1991 | Conley et al. | 395/877 |
| 5,295,252 | 3/1994 | Torii et al. | 395/454 |
| 5,379,379 | 1/1995 | Becker et al. | 395/250 |
| 5,485,589 | 1/1996 | Kocis et al. | 395/421.03 |

*Primary Examiner*—Eddie P. Chan
*Assistant Examiner*—Kevin L. Ellis
*Attorney, Agent, or Firm*—John G. Mesaros; James M. Thomson; George B. Almeida

[57] ABSTRACT

A method and apparatus for data storage and retrieval including first and second banks of refreshable memory, such as DRAMs. The user application provides a write clock and a read clock, the read clock being independent of the write clock. FIFO buffers are provided between the user application and the memory, with the buffers providing for read data with associated addresses and write data with associated addresses. A DRAM controller system is provided including a timing generator for the DRAM controlled by an external clock. The controller system controls the buffers to enable the continuous writing of user data to one of the first and second banks at a given address, with the user address and data synchronized to the write clock, while enabling simultaneous reading of data at a user provided address from the other of the first and second banks, with the loading of read addresses and outputting of read data occurring continuously and synchronously to the read clock. Refresh of the memory occurs when the read or write buffer is not full.

12 Claims, 4 Drawing Sheets

METHOD AND APPARATUS FOR BUFFERING A USER APPLICATION FROM THE TIMING REQUIREMENTS OF A DRAM

This is a continuation of application Ser. No. 07/965,118, filed on Oct. 22, 1992, now abandoned.

FIELD OF THE INVENTION

This invention relates generally to a method and apparatus for controlling a buffer, and more particularly to a method and apparatus for controlling at least one bank of dynamic FIFO (first-in first-out) RAM memory for storage and retrieval of digitized data at real time rates.

BACKGROUND OF THE INVENTION

In the storage and retrieval of digital information, whether computer digital data or digitized representations of video or audio or other signals, different media have been utilized. In prior art storage and retrieval of digitized video or other data at real time rates, static RAMs (SRAMs) have been predominantly used, primarily due to ease of interface with other components and subsystems within the system. SRAMs are generally easier to use for high speed video and data storage, have fewer special modes and signal requirements, and don't require refreshing. However, SRAMs use more transistors per bit of storage. Thus for a given amount of storage they are substantially more expensive in cost, space and power usage.

On the other hand, Dynamic Random Access Memory (DRAM) is the most efficient semiconductor memory available in terms of cost, size and power. However, there are several attendant drawbacks to the use of DRAM, for example, the timing signals required to drive it are complex and very specific to the DRAM type and mode used; DRAM must be refreshed at regular times to retain data; and access time depends on the particular sequence of Row and Column Addresses applied to the DRAM. In some instances, the designer must typically add a complex state machine to the system to generate the required timing. In addition, the user data flow must be interrupted to allow time for refresh of the memory system.

In accordance with an aspect of the present invention, there is provided a cost effective Dynamic Random Access Memory (DRAM) controller system to enable the use of lower cost DRAMs in applications previously utilizing SRAMs.

The present invention obviates many of the disadvantages of the prior art and provides further related advantages.

SUMMARY OF THE INVENTION

The foregoing and other objects of the invention are accomplished by providing a memory controller method and apparatus for enabling the application of DRAM to high-speed video data storage and retrieval with an ease of interface better than that of standard SRAM. A dynamic random access memory controller system is provided between the user application and the DRAM memory banks, whereby the user application is buffered completely from the specific timing requirements of the DRAM memory banks. User write and read access to the memory occur synchronously at rates chosen by the user application, while the DRAM timing is independently set by the controller system to match that of available commercial DRAMs. The user application need only apply inputs to the controller system as a sequence of write clock, data, and address, and read clock, and address. The controller system examines these inputs and automatically selects the appropriate DRAM modes: Row/Column Read/Write, Refresh, Fast Page mode, etc. The bank of DRAM appears to the user application as a large bank of synchronous static RAM.

Other features and advantages of the present invention will become apparent from the following detailed description, taken in conjunction with the accompanying drawings in which like reference numerals refer to like elements in the several views.

DETAILED DESCRIPTION OF THE PREFERRED EMBODIMENT

General Top Level Description

Figure 1:
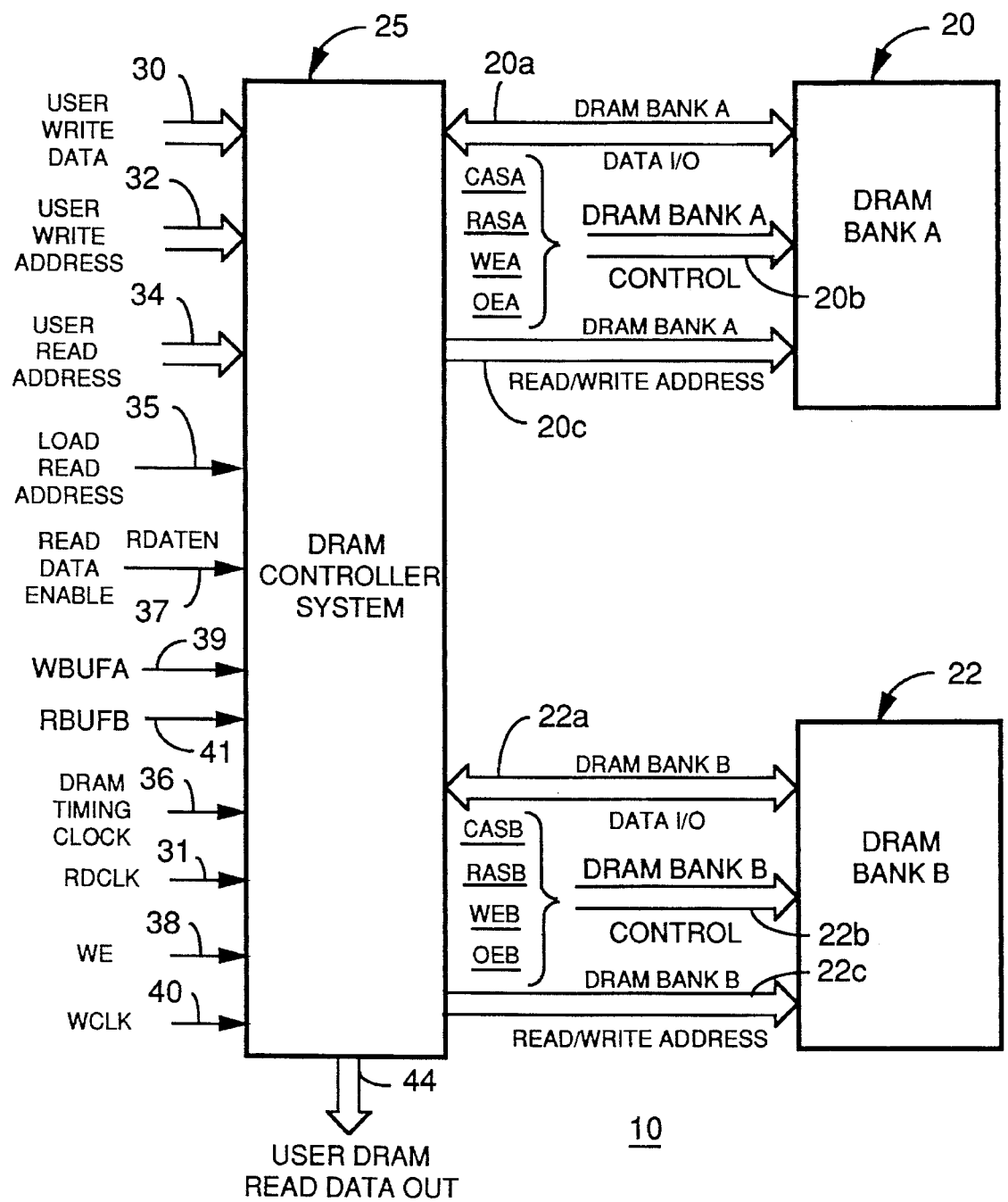
FIG. 1 is a block diagram of a dynamic FIFO RAM system according to the invention.

Referring now to the drawings, and particularly to FIG. 1, there is shown a block diagram of a first-in-first-out dynamic random access memory (DRAM) system, generally designated 10, in which a DRAM controller system 25 is interposed between certain input signals and first and second memory banks 20 and 22, designated DRAM Bank A and DRAM Bank B, respectively. As will become apparent, the input signals are user application dependent or specific, with DRAM controller system 25 providing the interface between the user and the memory banks 20 and 22 at a clock rate consistent with the DRAM requirements.

The user application inputs are divided into data and control/timing signals, the data inputs being "User Write Data" over bus 30, "User Write Address" over bus 32, and the "User Read Address" over bus 34. The control/timing signal inputs include the Load Read Address over lead 35, the DRAM timing clock signal over lead 36, the read data enable [RDATEN(–)] signal over lead 37, the write enable (WE) signal over lead 38, the read clock (RDCLK) signal over lead 31 and the write clock (WCLK) signal over lead 40. For purposes of the herein described application the DRAM timing clock signal 36 is 27 megahertz, although any other frequency may be conveniently employed for a given memory set.

The interface between the DRAM controller system 25 and each of the DRAM banks A and B, respectively designated 20 and 22, include Data input/output lines, read/write control lines and read/write address lines, these being designated 20a, 20b and 20c for bank 20, and 22a, 22b and 22c, respectively for bank 22. The control lines include certain control signals, the last letter of which refers to the respective bank "A" or "B", these control signals being column address strobe (CAS), row address strobe (RAS), write enable (WE), and output enable (OE), such control signals normally being associated with dynamic random access memories.

The DRAM controller system 25, in response to appropriate inputs and selections ultimately provides the user DRAM read data out on line 44 from DRAM bank A or B, as directed via the controller system 25 in response to the user application read related input signals.

DRAM Controller System

Figure 2A:
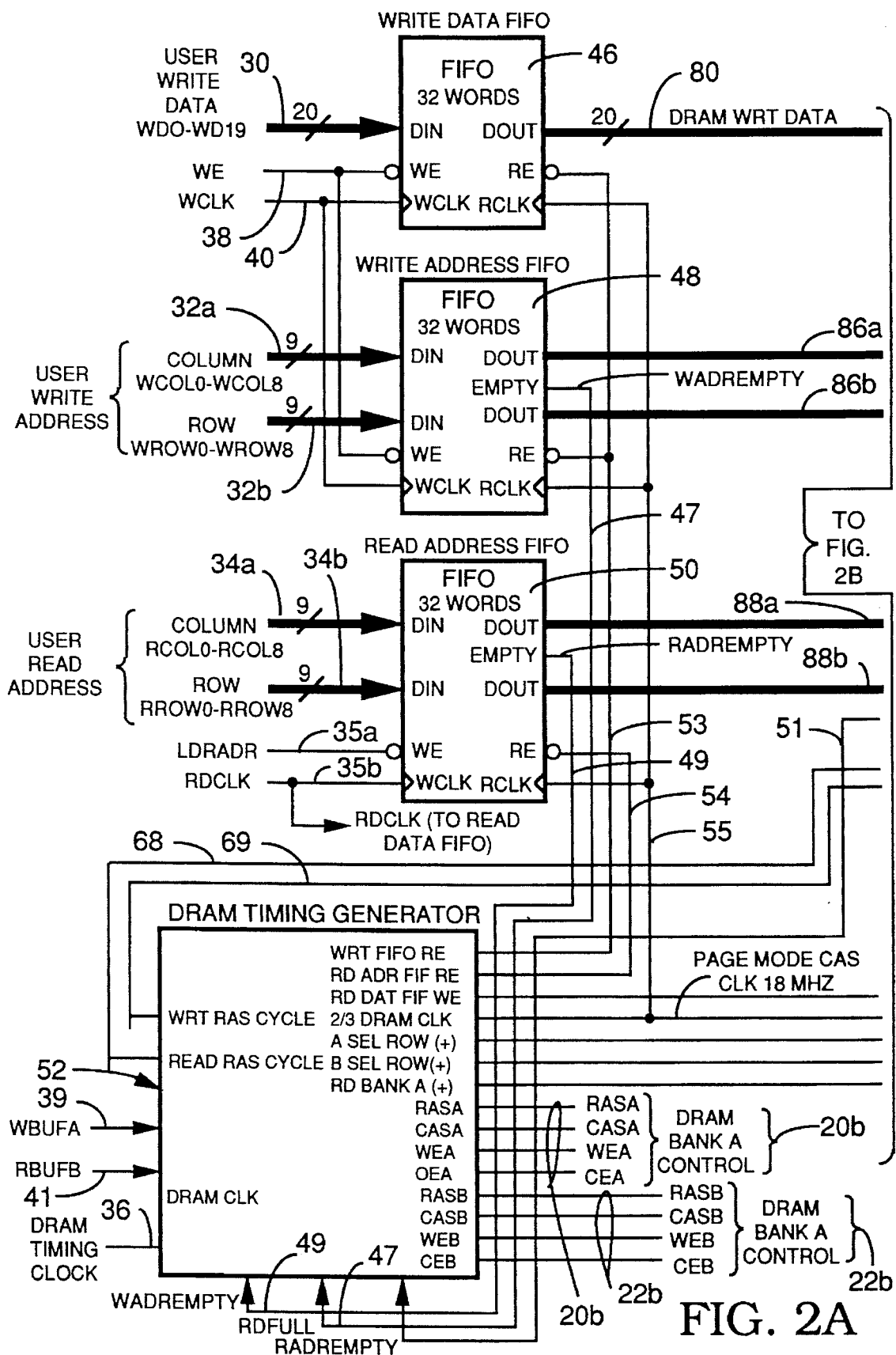
FIGS. 2A–2C, when connected together as indicated thereon, form a block diagram of the dynamic ram controller system used in the system of FIG. 1.
Figure 2B:
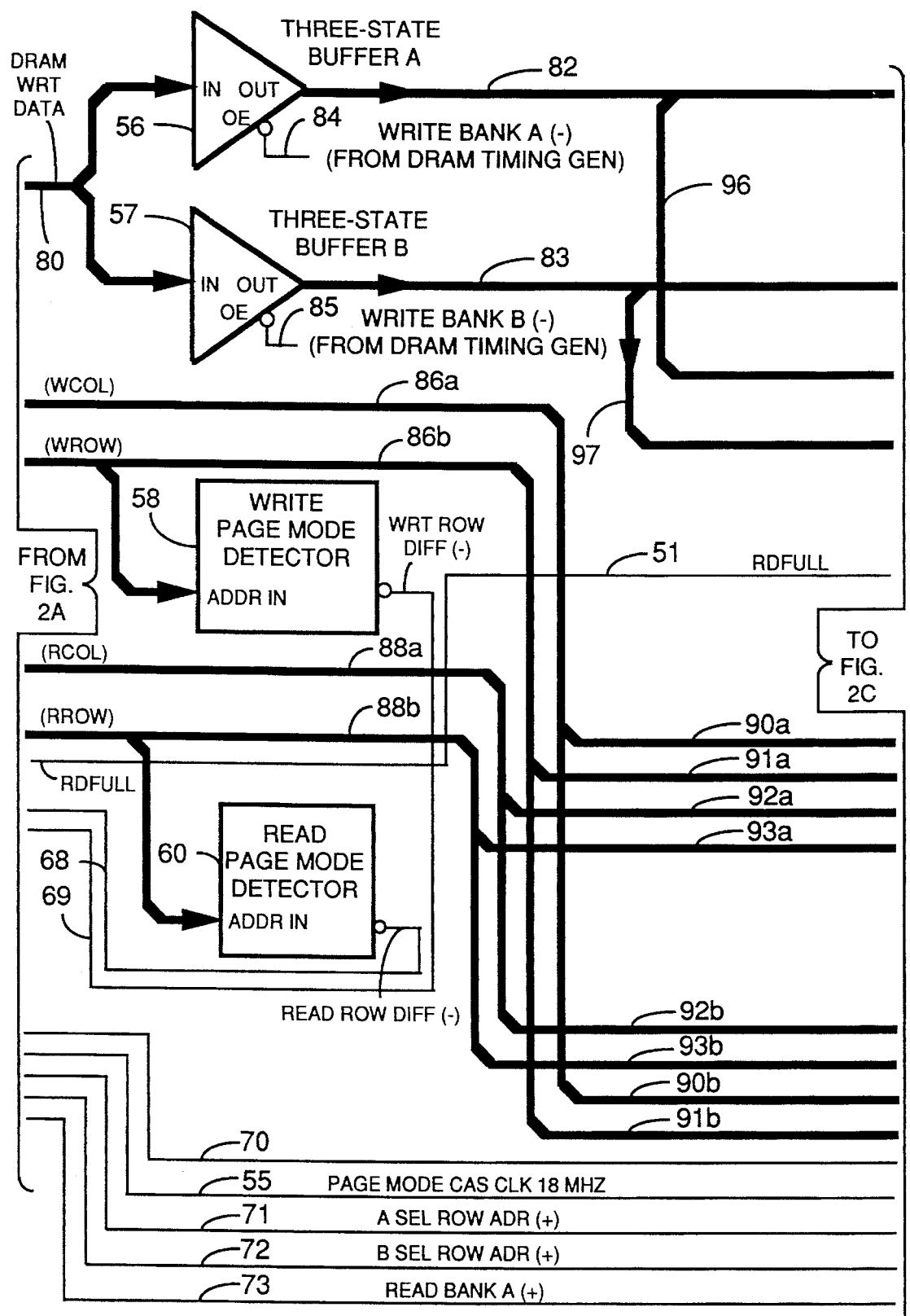
Figure 2C:
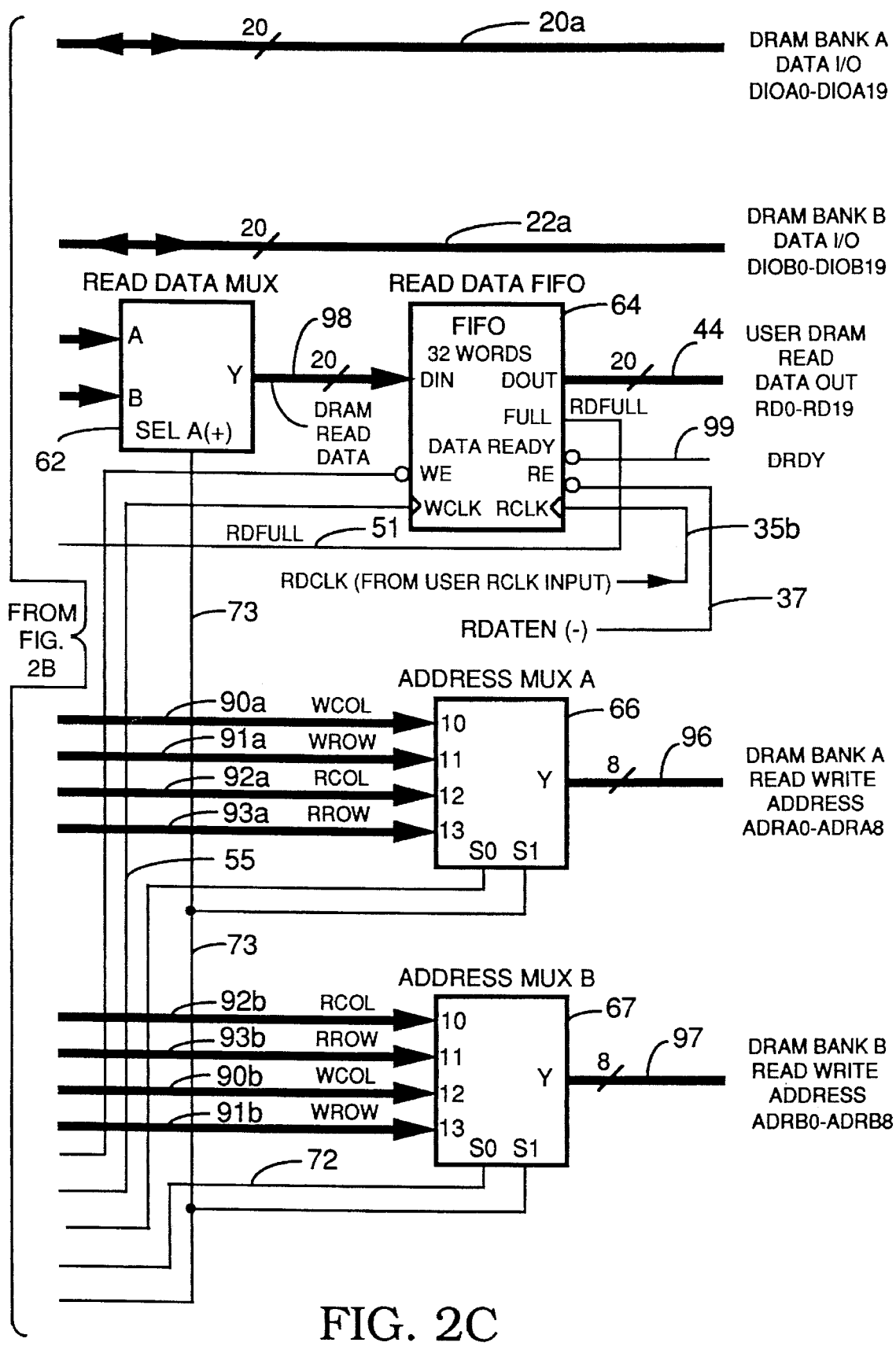

Referring now to FIGS. 2A–2C, which collectively, when placed side by side, form a logic diagram of the DRAM controller system 25. The user write data is transmitted over bus 30 to the data input of a buffer, designated the write data FIFO 46, the user write address data is transmitted over buses 32a and 32b (which collectively make up bus 32) to the two data inputs of a write address (ADR) FIFO 48 and the user read address data is transmitted over buses 34a and 34b (which collectively make up bus 34) to the two data inputs of the read address FIFO 50. Each of the FIFOs 46, 48 and 50 is, for example, a 32 word FIFO buffer with the number of bits per word differing.

As shown on bus 30 for write data FIFO 46, there is a slash with the numeral "20" thereabove, this designating a 20 bit data bus. Similarly, with respect to the user write address data, bus 32a carries 9 bit data relating to the column address data to be written, while bus 32b carries 9 bit data relating to the row address data associated with the column address data for the FIFO 48. For the read address FIFO 50, bus 34a carries 9 bits of column data while bus 34b carries 9 bits of row data associated with the column data on bus 34a.

Each of the FIFOs 46, 48 and 50 is provided by the user application with two other inputs, which are designated "WE" (write enable), which is an active low input, and "WCLK" (write clock), with the like inputs of FIFOs 46 and 48 being coupled together for receiving the corresponding control signals over leads 38 (WE) and 40 (WCLK), respectively. The other two inputs include the read enable (RE) input on lead 53 provided by the timing generator 52, which is an inverting input and the RCLK (read clock) input on lead 55.

Each of the WE and WCLK inputs to both FIFOs 46 and 48 is provided from a common source, this being by means of leads 38 and 40 transmitting the write enable and write clock signals, respectively, to the appropriate like inputs of the two FIFOs 46 and 48. The read address FIFO 50 is provided with the same control inputs, that is WE and WCLK; however, the inputs thereto are respectively provided over leads 35a and 35b (where 35b corresponding to lead 31 in FIG. 1), which are respectively designated LDRADR (load read address) and RDCLK (read clock), these two inputs being provided by the user application. The LDRADR signal on lead 35a is provided to the active low WE input of the read address FIFO 50 while the RDCLK signal on lead 35b is applied to the WCLK input thereof. As will become apparent, the user write and read access to the memory occur simultaneously at rates chosen by the user application, while the DRAM timing is independently set to match that of available commercial DRAMs. All user write signals are synchronous to the WCLK signal, while all user read signals are synchronous to the RCLK signal. However, the WCLK and RDCLK signals need not be synchronous with respect to each other, that is, the read and write functions need not be synchronous, and the RDCLK and WCLK can be unrelated. The user application need only apply a sequence of write clock (WCLK), data, and address (Column and Row), and read clock (RCLK) and address.

DRAM Timing Generator

For purposes of controlling the controller system 25, a DRAM timing generator 52 is provided within the system to provide internal timing and control signals to the controller system 25 components, which include the aforementioned FIFOs 46, 48 and 50 as well as the following components, including first and second three-state buffers 56, 57, a write page mode detector 58, a read page mode detector 60, a read data multiplexer 62, a read data FIFO 64, an address multiplexer A 66 and an address multiplexer B 67, the latter two multiplexers being for control of address data alternatively to one of DRAM bank A 20 or DRAM bank B 22, respectively.

The timing generator 52 receives, as an input, the DRAM timing clock signal on lead 36, and transmits timing and control signals consistent with the DRAM timing requirements, and independently set to match that of commercially available DRAMs, while the user read and write access to the DRAM memory banks A and B occur simultaneously at rates controlled by the user applications.

The signals generated by the timing generator 52 include control signals for the FIFO buffers 46, 48 and 50, these being a write FIFO read enable (WRT FIFO RE) signal on lead 53, a read address FIFO read enable (RD ADR FIF RE) signal on lead 54 and a ⅔ DRAM clock signal (⅔ DRAM CLK) or timing signal on lead 55, this latter signal providing a timing frequency of ⅔ of the DRAM timing clock signal, that is a signal at, for example, a frequency of 18 megahertz which is provided to the RCLK inputs of each of the Write Data FIFO 46, the Write Address FIFO 48 and the Read Address FIFO 50. In addition, this reduced frequency clock signal is coupled to the WCLK input of the Read Data FIFO 64, with the identification on the lead of PAGE MODE CAS CLK (18 MHz), signifying a page mode column address strobe signal of 18 megahertz.

Other generated output signals include the DRAM banks A and B control signals over leads 20b and 22b, respectively, which are the row address strobe (RAS), the column address strobe (CAS), the write enable signal (WE) and the output enable signal (OE), with the respective signal in the drawing of FIG. 2A bearing an "A" or "B" suffix for the appropriate DRAM memory bank to which it applies.

The signals on leads 53 and 54 are both read enable signals with the signal on lead 53 coupled to the inverting inputs RE (read enable) of the write buffer FIFOs, that is write data FIFO 46 and Write Address FIFO 48, while the read enable (RD ADR FIF RE) signal on lead 54 is coupled to the RE input of the Read Address FIFO 50.

The timing generator 52 also receives, as inputs, write and read row address strobe cycle signals (WRT RAS CYCLE and READ RAS CYCLE, respectively) on leads 68 and 69, respectively, from inverting outputs of the write and read page mode detectors 58 and 60, respectively, these signals being respectively designated at the outputs as WRT ROW DIFF(–) (write row difference) and READ ROW DIFF(–) (read row difference). The negative sign, that is (–), after each of the signal descriptions indicates that a negative going output from the write page mode detector 58 and read page mode detector 60 is required to enable the function of the respective signal at the timing generator 52. Other input signals are WBUFA, on lead 39, which selects bank A for the write process, and RDBUFB, on lead 41, which selects bank B for the read process. When the signal WBUFA on lead 39 is high, a Write Bank A command signal is issued, and when it is low or false, a Write Bank B command signal is issued. When the signal RBUFB is high or true, a Read Bank B command signal is issued and, correspondingly, when low or false, a Read Bank A command signal is issued. Effectively, the outputs of the timing generator 52 which are controlled by these WBUFA and RBUFB signals are those write control outputs on buses 20b and 22b, along with the read bank command on line 73.

Three additional inputs to the timing generator 52 are status signals indicative of the state of certain of the FIFO buffers, principally the Write and Read Address FIFOs 48 and 50, respectively, and the Read Data FIFO 64. These status signals appear as inputs on lead 47, 49 and 51, which are respectively designated WADREMPTY, RADREMPTY AND RDFULL, which translate, respectively, to the Write Address FIFO being empty, the Read Address FIFO being empty, and the Read Data FIFO being full.

Other output signals from the timing generator 52 signals on leads 71–73, which are, respectively, DRAM bank A select row ADDRESS signal [A SEL ROW ADR(+)], DRAM Bank B select row address [B SEL ROW ADR(+)] and DRAM read bank A [RD BANK A (+)], the plus signal after each signal designation indicating the requirement of a positive level signal to effect the desired function, and, correspondingly, for the DRAM read bank A signal, a low level effects the same function for the other memory bank, that is DRAM bank B.

FIFO Data Outputs

The FIFO buffers, as previously mentioned, include the Write Data FIFO 46, the Write Address FIFO 48, the Read Address FIFO 50, and the Read Data FIFO 64. Data from the Write Data FIFO is transferred out via line 80 in, for example, a 20 bit format to the inputs of first and second three-state buffers 56, 57, with the outputs thereof being communicated out via lines 82, 83, respectively, the outputs being enabled through the inverting output enable (OE) inputs on leads 84, 85, respectively, which receive the control signals therefor from the DRAM timing generator 52. These control signals are Write Bank A (−) on lead 84 to buffer 56 and Write Bank B (−) on lead 85 to buffer 57, which correspond to the WEA and WEB or "write enable" outputs appearing on lines 20b and 22b, respectively.

When the WBUFA signal on lead 39 to the DRAM timing generator 52 is high, Write Bank A(−) on lead 84 will be low, and the three-state buffer A 56 is active. On the other hand, if the WBUFB is low, Write Bank B (−) is low, activating the complementary three-state buffer B 57. Lines 82 and 83 are part of the DRAM Bank A Data I/O bus 20a and the DRAM Bank B Data I/O bus 22a, respectively, the outputs of which in FIG. 2C are designated DIOA0–DIOA19 and DIOB0–DIOB19, respectively, these being the 20 bits of data being read or written via these I/O buses.

Two data outputs are provided from the Write Address FIFO 48 over lines 86a and 86b, which correspond to the column and row data inputs over lines 32a and 32b. Similarly, the two sets of data outputs of the Read Address FIFO 50 are communicated via lines 88a and 88b, which correspond to the column and row address data on input lines 34a and 34b, thereof. The row address information on line 86b is provided as an input (ADDRIN) to the Write Page Mode Detector 58, and the row data information on line 88b is provided as an input (ADDRIN) to the Read Page Mode Detector 60. Each of these provides an inverted output on leads 69 and 68, respectively, to the "Read RAS Cycle" input and "WRT RAS Cycle" input of the timing generator 52. When the write row address changes value, Write Page Mode Detector 58 outputs a Row pulse on lead 69 (WRT RAS CYCLE). The Read Page Mode Detector 60 operates similarly.

The Data Output (DOUT) signals on lines 86a (DRAM WRITE COLUMN ADR) and 86b (DRAM WRITE ROW ADR) of the Write Address FIFO 48 are transmitted, via bus portions 90a and 90b, respectively, of bus 86a to the Write Column (WCOL) inputs, and via bus portions 91a and 91b, respectively, of bus 86b to the Write Row (WROW) inputs of the Address Multiplexers 66 and 67, respectively. Similarly, the Data Output (DOUT) signals on lines 88a (DRAM Read Column Adr) and 88b (DRAM Read Row Adr) of the Read Address FIFO 50 are transmitted, via bus portions 92a and 92b of bus 88a to the Read Column (RCOL) inputs and, via bus portions 93a and 93b of bus 88b, to the Read Row (RROW) inputs of the Address Multiplexers 66 and 67, respectively. The data outputs of the multiplexer 66 (Address MUX A) appears as nine bits on line 96 (ADRA0–ADRA8) while the output data of the multiplexer 67 appears as nine bits on line 97 (ADRB0–ADRB8), the outputs being labeled "DRAM Bank A Read Wrt Address" and "DRAM Bank B Read Wrt Address", respectively.

For the user data path, the outputs of the three state buffers 56 and 57 are transmitted over lines 82 and 83, respectively, which are the output portions of the two way buses 20a and 22a, respectively. The input lines of the buses 20a and 22a are designated 96 and 97, respectively, which are provided as inputs "A" and "B", respectively to the read data multiplexer 62, the output "Y" of which is transmitted over line 98 as 20 bit data to the input (DIN) of the read data FIFO 64. It is to be understood that for description purposes, different portions of a single bus bear different reference numerals, such as buses designated 20a, 82 and 96 are one physical bi-directional bus. Similarly, buses bearing reference numerals 22a, 83 and 97 are one physical bi-directional bus. The selection of the data from the "A" or "B" input of the read data multiplexer 62 is determined by the condition of the signal at the select input [SEL A(+)], which is the Read Bank A(+) signal output on lead 73 from DRAM timing generator 52.

The Read Data FIFO 64 is typically a 32 word buffer of 20 bit word size, with the inputs including control signals at the write enable (WE) input and the read enable (RE) input, which receive their signals over leads 70 and 37, respectively. The signal on lead 70 originates from the timing generator 52 and is identified as the Read Data FIFO Write Enable (RD DAT FIF WE) signal, while the signal on lead 37 is a user application controlled Read Data Enable [RDATEN(−)] signal. For clocking data into the Read Data FIFO, an 18 MHz signal is used at the WCLK input over lead 55 from the timing generator 52; and for clocking data out the user application read clock signal RDCLK on line 35b is applied to the RCLK input of FIFO 64. The Read Data FIFO 64, upon receiving the appropriate data and timing commands, initiates a data ready (DRDY) inverted signal output on lead 99 thereof, which is used as an enabling signal for transfer of data out from the selected DRAM bank over lines 44 for further use by the user.

General Description of Operation

In general, the DRAM Controller System 25 provides a fully buffered data interface between the user application data and control signals and the DRAM memory, with clock signals for the DRAM memory banks established according to the requirements of the type of DRAM utilized, and FIFO buffer data transfer rates determined by the user application. The following sections provide details on the various operations performed by the system.

Write Process

The user application writes to selected DRAM bank A 20 (or DRAM Bank B 22) via the controller system 25 by providing a sequence of Write Data words over bus 30 and corresponding Write Address Row and Column words over lines 32b and 32a, respectively. These are clocked into Write Data FIFO 46 and Write Address FIFO 48 by user signal WCLK over lead 40 when signal WE on lead 38 is active low. The internal DRAM timing generator 52 of the controller system 25, via the "EMPTY" flag signals on leads 47 and 49, senses the status of the Write Data FIFO 46 and Write Address FIFO 48. Each FIFO 48, 50 outputs a signal called "EMPTY" which is high if the applicable FIFO contains no data, and goes low when new data is written into the FIFO. The timing generator 52 uses these empty flags, that is, the WADREMPTY and RADREMPTY signals on leads 47 and 49, respectively, to initiate the read and write process. For the write process, the timing generator 52 initiates a write command to DRAM bank A 20 (or B 22) of the data at the Write Data FIFO 46 output on line 80 to the DRAM I/O (input/output) bus DIOA 20a (or DIOB 22a) by enabling the three-state buffer A 56 (or B 57) to provide outputs on one of lines 82, 83, respectively, for transferring the data via the bus to the DRAMs.

Concurrently, the Write Address FIFO 48 output on line 86a or 86b provides the DRAM row and column address to the respective DRAM bank A 20 (or B 22) via the ADDRESS MUX A 66 (or ADDRESS MUX B 67) to the selected DRAM bank (20 or 22). The Write Data and Write Address FIFOs 46 and 48, respectively, are read-clocked by the internal signal PAGE MODE CAS CLOCK, also referred to as RCLK, appearing on lead 55 from the timing generator 52. This fixed frequency clock as well as all DRAM related timing signals are synchronized to the DRAM controller system 25 input signal DRAM Timing Clock on lead 36. The DRAM timing clock frequency is chosen by the user to match the operating speed of the particular DRAM type used for DRAM banks A and B (20 and 22, respectively).

Before the write to the selected DRAM bank 20 or 22 occurs, the Write Row Address information on output line 86b is examined by the WRITE PAGE MODE detector 58. If the Write Row Address data on line 86b to be written is identical to that last row address written, the DRAM timing generator 52 selects a so-called Page Mode Write cycle to the DRAM. The Page Mode of operation allows substantially faster access; on the order of 55 nsec per write in available DRAMs. Page Mode can be used when only the Write Column Address on output line 86a has changed from the last-written value, while the Row Address is held at the previously used value. If the Write Page Mode Detector 58 indicates that the Write Row Address on line 86b differs from that of the last write, an inverted output signal is provided via lead 69 to the DRAM timing generator 52, which selects a full write cycle, consisting of a row address load with RAS signal over the appropriate output lead of the leads 20b or 22b to DRAM bank A 20 or B 22, followed by column address load with CAS signal over the appropriate related lead of lines 20b and 22b. This takes on the order of 220 nsec with available DRAMs. The DRAM timing generator 52 will automatically select Page Mode or full Row, Column write cycles as determined by the user write address sequence, maximizing the write data rate to DRAM.

The Page Mode write cycle is selected by default unless a row difference is detected by write page mode detector 58, which causes selection of a full row, column memory cycle. Only the row address in the write address FIFO 48 is examined and, if FIFO 48 contains a new address word, and the row portion of that address has not changed as detected by write page mode detector 58, the page mode is used. The Page Mode of operation allows substantially faster access; on the order of 55 nsec per write in available DRAMs. It may be used when only the WRITE COLUMN address on output line 86a has changed from the last-written value.

In normal applications, the user write address sequence appearing on lines 32a, 32b is chosen to repeat the Write Row Address (output on line 86b) as often as possible maximizing the use of fast Page Mode. Furthermore the internal PAGE MODE CAS CLOCK on lead 55 (RCLK input to FIFOs 46, 48, 50) is normally set to a frequency higher than the frequency of the user signal WCLK on lead 40. The maximum WCLK frequency that can be sustained depends on the user write address sequence via buses 32a and 32b to write address FIFO 48. If the sequence repeats the row address as often as possible (changing only the column address), WCLK can approach 18 MHz since fast page mode can be used. This allows the transfer of data and address from the Write Address and Write Data FIFO buffers 48 and 46, respectively, to DRAM banks A or B, 20 or 22, to occur more often than the user data and address words are written to the FIFOs. Thus the FIFO buffers 48, 50 are kept substantially empty. However, if the row address must change on every access, WCLK can only approach 4.5 MHz, since the slower full row/column memory cycle must be used when the row address changes.

Write Refresh Process

In video applications the user write sequence will often be continuous without gaps lasting at least a television field, typically 16.6 msec or 20 msec. In data recorder applications, the write sequence may continue indefinitely without gaps. Therefore the DRAM Controller System 25 must handle the DRAM refresh problem without interrupting the user data flow. The specifications of commonly available DRAMs require each of 512 Rows to be refreshed within an 8 msec period. Accordingly, the DRAM timing generator 52 will pause the write process and insert a refresh cycle (which is a special sequence of RAS and CAS pulses controlled by the timing generator 52) at a rate such that all Rows are refreshed within the specified time. During the Refresh period of about 220 nsec for currently available DRAMs, the Write Data and Write Address FIFOs 46 and 48, respectively, will stop reading but will continue to fill with user write data and address words. After a completed refresh cycle, the transfer of write data and address to DRAM continues at rate sufficient to empty the FIFOs before the next refresh cycle. Thus, the refresh process occurs transparently to the user without interruption of the write sequence.

Read Process

As the write process occurs in DRAM bank A 20 (or B 22) a read process may simultaneously occur in the other DRAM bank B 22 (or A 20). Write and read always occur in opposite banks. The user application begins the read process by clocking a sequence of Read Column and Row addresses into the controller system 25 with the related signal RDCLK on lead 35b (at WCLK input of Read Address FIFO 50), with the enable signal LDRDADR on lead 35a active low. The Read Address FIFO 50 begins to fill with data and this is sensed by the DRAM timing generator 52 initiating the DRAM read cycle. The Read Row Address on line 88b at the FIFO 50 output is examined by the Read Page Mode detector 60 and a Page Mode Read Cycle is selected if the new Read Row Address is identical to the previous Read Row Address. As in the write process, the default READ CYCLE uses fast page mode. If the Read Row Address changes as detected by the Read Page Mode Detector 50, the Read Row Diff (−) output from detector 60 goes low, thereby selecting a full row/column read cycle via the timing generator 52. If two sequentially read Row Addresses differ, the Read Page Mode Detector 60 issues a negative pulse over lead 68 to the Timing Generator 52, indicating a full row/column cycle should be used. The DRAM timing generator 52 then applies the Read Address with appropriate DRAM timing signals RAS and CAS to initiate a full row/column READ cycle, specifically, the timing generator 52 generates two sequences of RAS, CAS signals. One sequence is appropriate for a full RAS/CAS cycle. The other sequence is appropriate for a fast Page Mode read cycle. The particular sequence selected is controlled by the state of the output of the Read Page Mode Detector 60, that is the Read Row Diff(−) signal on lead 68 to the timing generator 52. Read data from the selected DRAM bank is written to the Read Data FIFO 64 via the DRAM Bank B 22(or A 20) DATA I/O bus 22a or 22b, respectively, through the Read Data MUX 62. The read data is clocked into the Read Data FIFO 64 with the internal Page Mode CAS Clock signal on lead 55 synchronized to the DRAM Timing Clock as in the Write process.

The sequence of reading continues, loading the Read Data FIFO 64 with read data. When the first word of read data is available it appears at the User DRAM Read Data outputs on line 44 with the data ready flag DRDY on lead 99 active low. The DRDY signal on lead 99 is provided to the user by the Read Data FIFO buffer 64 and it is high when the buffer 64 is empty and low when the buffer 64 contains new data. With the user signal RDATEN (Read Data Enable) on lead 37 high, Read data is held at the outputs on line 44 and the Read Data FIFO 64 continues to fill. If it becomes full this is sensed by the DRAM timing generator 52. The sensing occurs when the Read Data FIFO 64 outputs a Full signal (RDFULL) on lead 51 which goes high when buffer 64 is nearly full (this threshold being set at about 28 unread words). The Full signal causes timing generator 52 to stop the transfer of read data from the selected DRAM to the Read Data FIFO 64 via the DRAM Read Data bus 98 input and DRAM read cycles will be halted. The Read Address FIFO 50 will continue to fill as new user Read Addresses are loaded via lines 34a and 34b. When the user signal RDATEN on lead 37 is brought active low, read data will be clocked sequentially from Read Data output on line 44 by the clock signal RDCLK on lead 35b to the Read Data FIFO 64. The latency, or time delay, from Read Address in to Read Data out will be constant and set by the time between LDRDADR high to low on lead 35a and RDATEN high to low transitions on lead 37. In normal operation, the internal Page Mode clock frequency will be higher than the RDCLK user read clock frequency. Thus The Read Data FIFO 64 will be maintained essentially full and the Read Address FIFO 50 will remain nearly empty. This allows a continuous sequence of Read Address words to be applied to controller system 25 resulting in a continuous sequence of read data to appear at the Read Data output 44 after the latency period.

Read Refresh

As in the write process, the DRAM banks 20 and 22 must be refreshed during the read process to retain data. The DRAM timing generator 52 will generate refresh cycles to the DRAM bank being read such that all Rows are refreshed within the specified time (8 msec for currently available DRAMs). When a refresh cycle is issued to the DRAM bank being read, reading must pause for the refresh period (about 220 nsec for standard DRAMs). During the pause the Read Address FIFO 50 continues to fill and the nearly-full Read Data FIFO 64 will become less full. In normal operation the Read Data FIFO 64 will be kept full enough (by setting the latency to be about 32 clocks) such that it will not become empty during the Refresh cycle pause. After refresh, read cycles continue and the Read Data FIFO 64 will be filled before the next refresh cycle, thus Read refresh occurs transparently to the user read process, such process continuing without gaps or pauses.

While there has been shown and described a preferred embodiment, it is to be understood that various other adaptations and modifications may be made without departing from the spirit and scope of the invention.

I claim:

1. A control system for enabling the application of dynamic memory means to storage and retrieval of digital data in a user application system herein specified as a "user" external to the control system, the storage and retrieval being made to and from at least first and second banks of dynamic memory means, wherein the memory means requires standard data, address and timing signals in accordance with the type of dynamic memory means used, the system comprising:

means for providing user data, addresses and timing signals specific to the user, wherein the user timing signals include independent user write and read clocks;

means for buffering the user data, addresses and timing signals to make them independent of the standard data, addresses and timing signals of the dynamic memory means;

said means for buffering including means for receiving from said providing means user data and associated user addresses synchronized to said user write clock, and for writing said user data to the first bank of dynamic memory means at said associated user addresses using the dynamic memory means standard signals rather than the user write clock;

said means for buffering also including means for simultaneously reading data at the user addresses from the second bank of dynamic memory means, with the loading of read addresses from the user occurring synchronously in response to said user read clock rather than to the dynamic memory means standard signals, with accessing of data from the dynamic memory means at said associated user read addresses occurring in response to the dynamic memory means standard signals, and with the outputting of read data to the user occurring in response to said user read clock; and said user data, addresses and timing signals being independent of said dynamic memory means standard data, addresses and timing signals, and said user read clock and read address signals being independent of said user write clock and write address signals.

2. The system of claim 1 wherein the dynamic memory means is a dynamic random access memory (DRAM) and said system further includes, page mode read and write cycles from and to said banks of DRAM, and means including user address detecting means for automatic selection of said page mode cycle in response to the successive detection of the same user row address for enabling maximization of access rate of writing to and reading from said banks of DRAM with said independent user write and read clocks.

3. The system according to claim 1 wherein the dynamic memory means comprise first and second banks of dynamic random access memory (DRAM), and wherein said means for writing includes a first first-in-first-out (FIFO) buffer means for storing the user data and associated user addresses to be supplied to the first bank, and said means for simultaneously reading data at a user address includes second FIFO buffer means for storing user addresses to be supplied to the second bank and for storing the associated user data read from the second bank.

4. The system according to claim 3 wherein said first FIFO buffer means for said means for writing includes a write data FIFO buffer and a write address FIFO buffer, and said means for refreshing includes a DRAM timing generator for inhibiting writing to the DRAM in response to the fullness of one of the buffer means without interrupting the writing of said user data and associated addresses into said write data FIFO buffer and write address FIFO buffer during a refresh period.

5. The system according to claim 3 wherein said second FIFO buffer means for said means for simultaneously reading data at a user address includes a read address FIFO buffer and a read data FIFO buffer, and said means for refreshing includes a DRAM timing generator for inhibiting reading from the DRAM in response to the fullness of one of the buffer means without interrupting the inputting of said user addresses into said read address FIFO buffer or the reading of user data from the read data FIFO buffer during a refresh period.

6. The apparatus according to claim 3 including a timing generator means, wherein each of said write address FIFO buffer means and said read address FIFO buffer means provide a signal to said timing generator means when empty, and said read data FIFO buffer means provides a signal to said timing generator means when full, wherein said timing generator means initiates a write operation in response to the empty signal of said write address FIFO buffer means and a read operation in response to the empty and full signals from the read address and read data FIFO buffer means, respectively.

7. The apparatus according to claim 1 wherein said providing means includes means for providing user write and read address sequences, and said means for buffering includes means for writing and reading to and from said dynamic memory means in one of two modes determined by said user write and read address sequences respectively, wherein one of the modes is a normal memory write or read mode and the second of said two modes is a page mode cycle of write or read automatically initiated when said write or read address FIFO buffer means outputs a user address value which indicates the row address is held at the previously used value.

8. A method for enabling the application of dynamic memory means to storage and retrieval of digital data in a user application system, herein specified as a "user" external to the dynamic memory means, the storage and retrieval being made to and from at least first and second banks of the dynamic memory means, wherein the dynamic memory means requires standard data, address and timing signals in accordance with the type of dynamic memory means used, comprising the steps of:

receiving user information from said user including user data together with associated user addresses and user timing signals, wherein the user data, addresses and timing signals are independent of the standard data, addresses and timing signals of said dynamic memory means;

receiving, as part of the user timing signals, a user read clock independent of a user write clock;

writing said user data to said first bank at said associated user addresses using the dynamic memory means standard signals, with said user addresses and data received from said user synchronized to said user write clock rather than to the dynamic memory means standard signals; and simultaneously reading data at user provided addresses from said second bank, with the loading of read addresses from the user occurring synchronously with said user read clock rather than with the dynamic memory means standard signals, with accessing of data from the dynamic memory means at said associated user read addresses occurring in response to the dynamic memory means standard signals, and with the outputtting of read data to the user occurring in response to said user read clock.

9. The method of claim 8 wherein said method further includes page mode read and write cycles applied to said dynamic memory means, and said method further includes the step of automatically selecting said page mode cycle in response to a user address value which indicates the user row address is the same as the previous row address, for enabling maximization of access rate of writing to and reading from said dynamic memory means in response to said user write and read clocks.

10. The method according to claim 8 including a step of refreshing which occurs during selected periods in which the steps of writing and reading user data occur without interruption by said refreshing step, wherein said system includes read first-in-first out (FIFO) buffer means and write FIFO buffer means and wherein said step of refreshing occurs during given periods in response to the fullness of one of said FIFO buffer means.

11. The system of claim 3 wherein said user data is written in the first bank of DRAM in a selected order of the associated user addresses, and is read from the second bank of DRAM in a selected order of the user addresses, in response to the respective user write and read clocks.

12. The method of claim 8 wherein:

the step of writing includes writing the user data in a selected order of the associated user addresses; and the step of reading includes reading the user data in a selected order of the user addresses.

* * * * *